Aug. 14, 1923.  
H. W. HALL  
1,465,215  
WALL FOR DRUMS AND THE LIKE MADE OF MULTIPLY MATERIAL AND  
METHOD OF MAKING THE SAME  
Filed Aug. 11, 1921  2 Sheets-Sheet 1
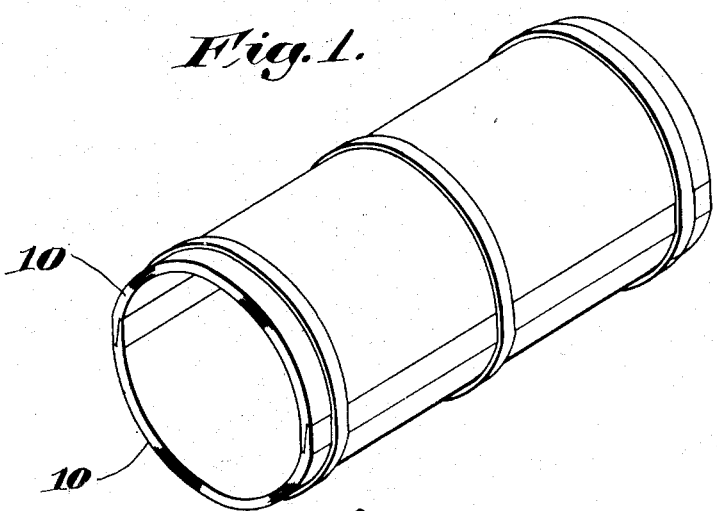
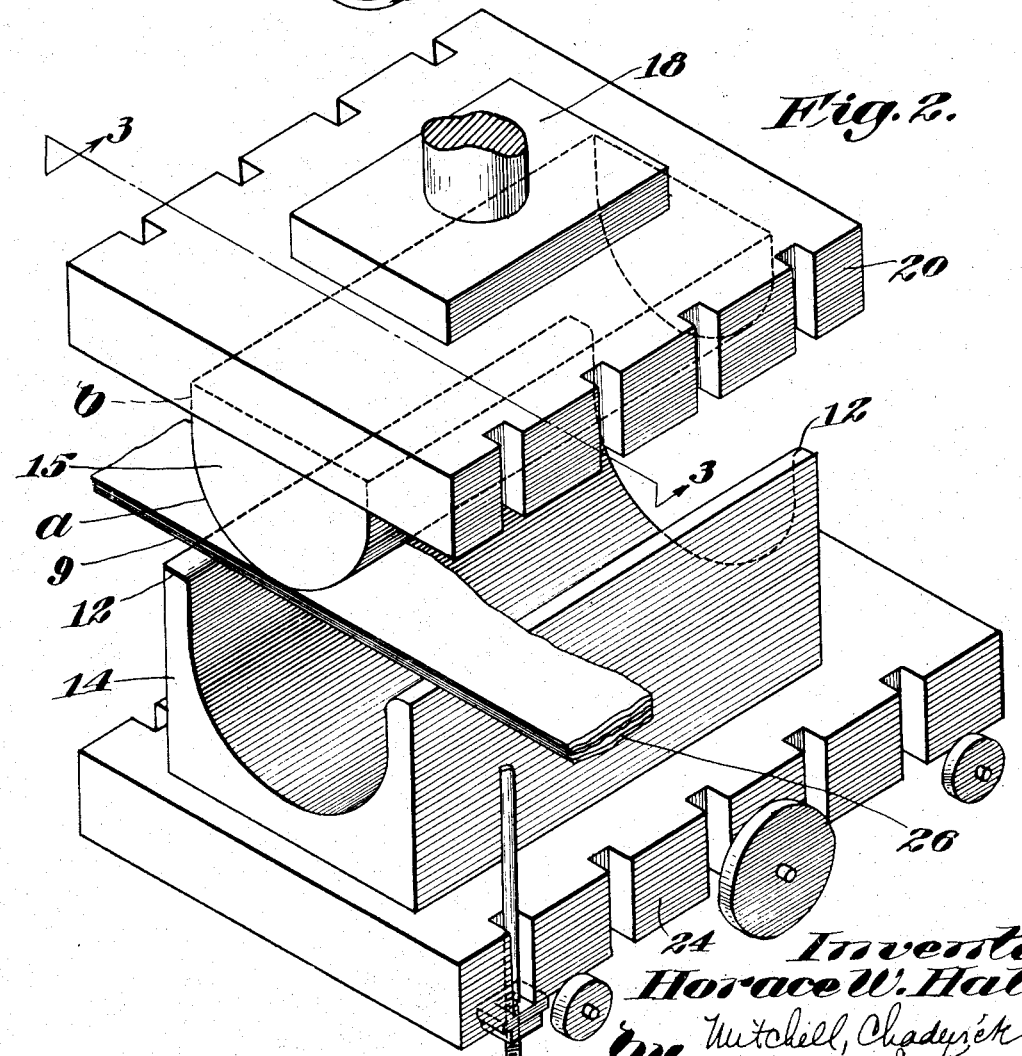
Inventor  
Horace W. Hall  
by Mitchell, Chadwick & Kent  
Attorneys Aug. 14, 1923.                                                  1,465,215
H. W. HALL
WALL FOR DRUMS AND THE LIKE MADE OF MULTIPLY MATERIAL AND
METHOD OF MAKING THE SAME
Filed Aug. 11, 1921          2 Sheets-Sheet 2
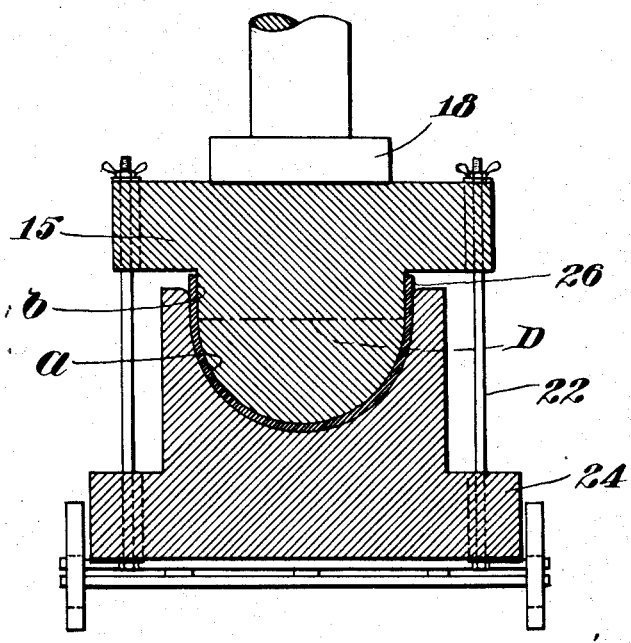
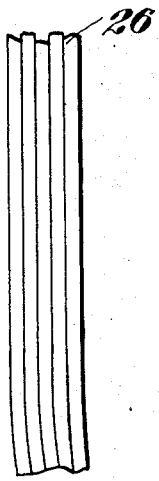
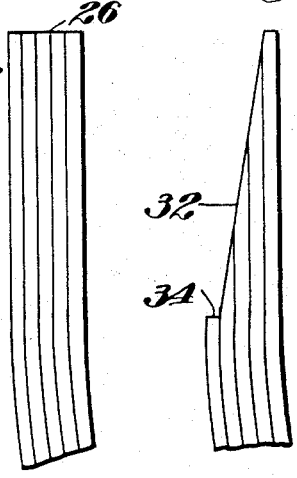
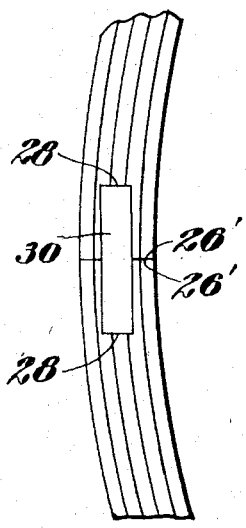
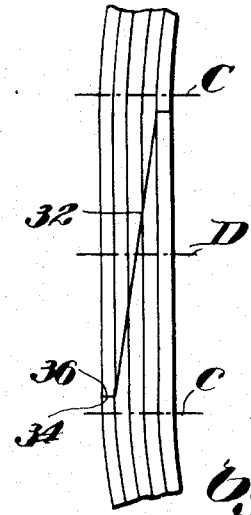
Inventor
Horace W. Hall
by Mitchell, Chadwick
& Kent
Attorneys Patented Aug. 14, 1923.

1,465,215

UNITED STATES PATENT OFFICE.

HORACE W. HALL, OF NEWTON CENTER, MASSACHUSETTS.

WALL FOR DRUMS AND THE LIKE MADE OF MULTIPLY MATERIAL AND METHOD OF MAKING THE SAME.

Application filed August 11, 1921. Serial No. 491,445.

*To all whom it may concern:*

Be it known that I, HORACE W. HALL, a citizen of the United States, residing at Newton Center, in the county of Middlesex and State of Massachusetts, have invented certain new and useful Improvements in Walls for Drums and the like Made of Multiply Material and Methods of Making Same, of which the following is a specification.

This invention relates to cylindrical containers and the like endless walls, and methods of making the same of plywood.

The superior lightness and strength of laminated boards made by gluing together sheets of veneering has led to many efforts to make tubs and barrels therefrom; but difficulty has always been experienced in making the ends of the layers fit together on the line where the enclosure is closed or completed. This is because the grain runs differently in different layers, and the length of the layers is also different, owing to some being around others. Even if they are carefully measured, so that each will be correct for the place it is to occupy, the unequal swelling due to direction of grain, when moisture is absorbed from the glue, is not estimatable accurately in advance, and the joints cannot be made tight. Especially is this difficult under the high pressure to which the composite board has to be subjected in order to bend it. If on the other hand the ply-board is first made complete, flat, and then is steamed and bent to desired curvature, the wood is put under such great internal stress during the process and upon drying that it is not permanent and tends to disintegrate by splitting and cracking, resulting in a considerable loss of material. Such breakage is especially apt to occur near the joint, where the over-lapped skived ends of the single piece that constitutes the cylinder are thin.

Among the objects of the present invention is that of making a perfectly joined cylinder of plywood easily; forming the same without excessive internal stress of the material, thus avoiding the danger of rupture and reducing the wastage to a minimum; providing a molding method having practically a single operation, thus reducing expense for labor, and plant; and having said single operation one that can be quickly executed with avoidance of the steaming and other steps consuming much time in methods hitherto known. The object first mentioned is attained by making the cylinder in sections, preferably two. These may be semi-cylindrical; but whatever fraction of a cylinder each is, it is molded with a marginal projection or addendum beyond the line where it is to be joined to the next section, which projection preferably is free from internal stress, and is of the same composite structure as the remainder, thus providing stock which may be worked or trimmed away in order to make the joint perfect, or which may, in some forms, itself constitute a fitted over-lap, projecting beyond the full half cylinder, for union with a similar over-lap on the other half.

By this method each section can be made of the precise length of curvature requisite to make the perfect complete snape desired. There is no problem of fitting ends of plywood laminæ together, for in the molding step, when the relations of these to each other is fixed, they are left of random lengths, regardless of fit; and when they are put together to make the fit they are under no tension with respect to each other, and the aggregate in one section is fitted to the aggregate in the other section without there being at the time any force actively tending to interfere or to separate the joint. It is a characteristic that the several layers of wood making up each section are bent simultaneously, and yet that each layer is permitted to bend individually without restraint by the others, and to adjust itself with respect to its neighbors by slipping over them to the position of least stress before it becomes a fixed part of the whole.

These objects are accomplished by depressing the multiply components of a board into a semi-cylindrical mold while the glue or other adhesive between them is still fresh and yielding, constituting in fact a lubricant, and thus forming the individual layers simultaneously, but separately, into the shapes they are to retain as parts of the completed sections. Edges may be left projecting from the semi-cylinder as tangential planes. The die is then clamped in the mold until the adhesive has become dry, after which the thus permanently bent section is removed from the mold, constituting a preliminary rigid form. Its projecting edges may be shaped with ease, to join with corresponding edges of any other section, and are free from internal stress. The finished container is formed by merely fastening the shaped edges of the section together, and by inserting a disk bottom and cover and putting hoops around if desired. The invention may be applied similarly to non-circular enclosures.

The accompanying drawings illustrate applications of the principles of the invention in the best manner in which I at present contemplate embodying it. It is intended that the patent shall cover, by suitable expression in the appended claims, whatever features of patentable novelty exist in the invention disclosed.

In the drawings:

Figure 1 is an isometric view of the shell of a container constructed in accordance with the present invention;

Figure 2 is a perspective showing the plywood in position between the die and mold ready to be pressed;

Figure 3 is a somewhat diagrammatic end elevation, in section as on line 3—3 of Figure 2, but with the die and plywood pressed into the mold;

Figure 4 is an end view, much enlarged, showing the edge of a section as it comes from the mold;

Figure 5 is a view showing the same edge squared, ready for being shaped to form a joint;

Figure 6 shows the end shaped to form a joint of the sort shown in Figure 8; and Figures 7 and 8 are views showing two types of joints between sections.

It is a prominent feature that the desired cylindrical form of the container is made in sections, instead, as has been usual heretofore, of trying to make one composite sheet constitute the whole circumference. From this it follows that the individual sections can be made quickly and easily; can be handled conveniently in shaping the edges which are to be joined; and can be joined without being in any state of internal stress at the joint. Preferably there are two sections to the complete container, thus making only two joints.

Referring to the drawings, there is shown in Figure 1, a substantially cylindrical shell comprising two halves 10, 10, each made of multi-ply veneer wood of as many layers as is desired, as for example is seen in Figures 2 and 4, each of which layers is separated from its neighbor by a coating of glue or other suitable adhesive. The layers of wood and glue are assembled to form a laminated sheet or plate 9 with edges roughly even. While the adhesive is still moist and slippery this flat sheet is placed across the upstanding top edges 12 of a mold 14. A die 15 having a semi-cylindrical lower face $a$ with tangential extensions $b$ upward is then placed upon the plate or sheet 9 after which both the die and the composite sheet are forced into the mold by a press plunger 18. A follow block 20, between the die and the plunger, has notches to receive clamping bolts 22, shown clearly in Figures 2 and 3, by which the die and veneering may be maintained under pressure in the mold. These engage over the top of the follow block 20 and under the bed 24 of a truck on which the mold may rest. After the bolts have been tightened, the press plunger may be withdrawn and the truck wheeled away and left for the glue to set under the compression. The pressing or molding of the layers is thus possible without heating or wetting of the wood. The adhesive acts as a lubricant to permit the individual layers to slide by each other to adjust themselves separately to their molded positions without frictional resistance. The wood is subjected only to such strains as occur upon the bending of the thin sheets of veneering, which strains are negligible in practice with ordinary dimensions of curvature in the bending. As compared with methods heretofore proposed, it is a feature of the present invention to bend or shape the wood into a form that is preferably semi-cylindrical, in which there is practically no danger of splitting or cracking the fibers of the material. When the heavy pressure is ultimately applied to the laminated plate, the latter is resting between the die and the mold and the stress upon it is compression instead of tension which aids the material in holding together. This is a decided advantage over processes in which the built-up wood plate is rolled or drawn in such manner as to tend to crack or rend it, in which cases the cohesion of the fibers under tension is all that is available to keep that material from rupturing.

To allow for easy insertion and removal of the die, and for facilitating the separation of the product from the mold, surfaces which are to be non-adhesive may be oiled. The die and mold are designed to work on a particular thickness of composite. For example for a five-ply container three sheets of one-eighth inch veneer may be used to be bent with the grain, and two sheets of one-twentieth inch veneer to be bent across the grain, making a total of nineteen-fortieths or thirty-eight eightieths inch of thickness of wood, without allowing for glue. The die and mold to operate on this may be made with a uniform space of seven-sixteenths or thirty-five eightieths inch intervening between them when the die is pressed into ultimate position. This then compresses the wood and glue a trifle and makes all perferctly tight, and also allows for slight inequalities of thickness encountered in practice. If desired the parts of the die above the horizontal diameter of the semi-cylinder may be splayed very slightly (not illustrated) to make sure that there is lateral pressure on the very top parts of the composite.

After the adhesive between the layers has become dry, the die is removed and the bent wood taken from the mold. The uneven ends 26 of layers above the diameter D, Figure 3, may readily be sawed off square as in Figure 5 at 26', to make two sections into a real cylindrical shell, after which a groove 28 may be cut in each edge to receive a glued spline 30 by which the edges are held tightly together to make the complete joint shown in Figure 7.

It is also a feature of the invention to provide so that a container can be molded whose two sections each extend over more than a half cylinder and thus overlap. In Figures 6 and 8 one variety of this form of joint is shown wherein the ends of the section are more or less beveled or scarfed to provide an extended flat surface 32 on each to which the other may be tightly glued. This bend 32 may extend across all the layers, or, as shown, may end in a shoulder 34 against which a similar shoulder 36 on the next section may abut. The manner in which this is provided makes the container flat sided at the joints and therefore only approximately cylindrical, as seen in Figure 1. The flat part is seen enlarged in Figure 8 between the points C—C, which denote the ends of a chord of the cylinder. This is accomplished by shaping the die and mold circularly to nearly a half cylinder, up to the point C, where the joint begins, say an inch below the horizontal diameter D and then continuing their surfaces along the chord perpendicular to that diameter to beyond where the other end of the chord would be if the cylinder were continued. Thus the wood will have edges projecting materially beyond the diameter, which may be trimmed back to the upper end of chord C C, referring to the lower section seen in Figure 8, for example, and then trimmed on the bevel 32 which will lie wholly in wood which has parallel straight undistorted elements. There will then be at the joint no internal tendency whatever for the layers to straighten, as occurs in a scarfed joint between two curved sections. And this length of strip in each section will have been molded beyond the half cylinder with a simple die press.

A cylindrical or the like shell constructed in accordance with the principles of this invention may receive top and bottom end pieces, hoops and handles, or other details of finish. It will be strong without the hoops, which are useful for protection when it is rolled, and will be remarkably durable because of the lack of internal stresses in the wood; and will have the lightness, tightness, etc., that are characteristic of the material of which it is made. The molding of the shell in sections capable of joinder with a well finished joint, which may be secured with dowel pins if desired, makes the whole extremely tough and stable.

The structure of the shell thus made is much superior to that produced when veneer is put together under tension, because it is not possible in any such method to get rid of the blisters that characterize rotary sawn veneer, due to the drying process thereof; and no other kind of veneer than rotary sawn is applicable for large work. In assembling sheets of veneer it is a feature that when rotary sawn veneer is used that that side of the sheet which was outward in the log be arranged to be curved outward in the mold. This establishes a relation between the fibers thereof approximating the relation between them when they were in the log. Sheets which are on the outside in the case of three ply and on the outside and chord in the case of five ply should be arranged with the grain parallel to the axis. This provides strength and minimizes distortion. The intervening plies constitute cross-banding and are preferably relatively thin, which permits the bend across the grain to be made with less serious strain. If the other sheet of veneer is thick, say one-eighth of an inch, it is advisable to moisten the outside face thereof with a sponge before putting it into the mold. The moisture thus absorbed will balance the moisture absorbed from the glue by the inner face of the same sheet and in consequence the expansion of the two faces of this sheet will be equal, preventing strain. When the glue sets, losing its moisture, both faces dry equally again relieving strain.

When the invention is practiced as herein illustrated, by providing an addendum beyond the line where the finished joint is added, I find it useful to have a mark on the mold indicating the location at each edge where the finished joint should be, and then by pencil to mark the location on the multi-ply board, this gives accurate indication for working of the saw in the next operation, viz. the shaping of the joint. Although it is preferable that the joint should be at the semi-circular line, with the addendum to be worked away in shaping the joint, it is feasible to cut the veneer sheets so that they will stop approximately at the half circle line and then to rim away only a trifle, thus leaving the sections slightly less than 180 degrees each. In this case, however, the matter trimmed away really constitutes a temporary addendum beyond the finished point as in the preferred case.

What I claim is:

1. The method of making an enclosing wall of multi-ply material, which comprises molding the material into preliminary rigid forms, each of which contains a part of the complete wall-form, plus addenda at its edges; and then trimming the edges to make said preliminary forms into sections of the desired wall which combine together to make said enclosure.

2. A method of making a circular multi-ply wall which comprises molding and joining together plies in preliminary rigid forms which each contain part of the complete circle plus addenda at its edges; and then trimming the edges to make said preliminary forms into sections of the complete circle which combine together to make said wall.

3. The method of making an enclosing wall of multi-ply material, which comprises assembling the plies with glue intervening; molding them together into a preliminary form, at the same time permitting them individually to slip over each other for adjustment to positions of minimum tension; allowing the glue to set with the plies in said adjusted positions, thus forming a rigid unit; said unit thus formed containing a part of said wall-form, with addenda at its edges; and then trimming the edges of the said unit to make a section which combines with another section of the complete wall-form.

4. The method of making an enclosing wall of multi-ply material, which comprises assembling the plies with glue intervening, forming the assembly into a preliminary form under compression applied primarily by motion in one direction only, at the same time permitting them individually to slip over each other for adjustment to positions of minimum tension; allowing the glue to set with the plies in said adjusted positions, thus forming a rigid unit; said unit thus formed containing a part of said wall-form, with plane addenda at its edges; and then trimming the edges of said unit to make a section which combines with another section of the complete wall-form.

5. An enclosing wall of multi-ply material, comprising a combination of two or the like small number of sections which together make an endless water tight circuit; each said section being composed of the multi-ply material molded in suitable form to constitute a portion of the wall and being at each edge joined to the next section with a joint having surfaces that face toward the interior and the exterior of the circuit.

6. A circular form comprising molded multi-ply sections each comprising a part of the circle; said sections being substantially rigid and free from internal stress, and having edges adapted to fit corresponding edges of adjoining sections.

7. An enclosing wall comprising rigid multi-ply sections, molded in suitable form to be joined together edgewise to constitute a complete enclosure said sections being free from internal stress at the joints.

8. An enclosing wall comprising molded multi-ply sections joined rigidly together edgewise to form a complete enclosure, the portion of each section at a joint being free from internal stress applied by one ply to another along the surfaces between plies.

9. An enclosing wall comprising molded multi-ply sections joined rigidly together edgewise to form a complete enclosure, being free from internal stress applied by one ply to another along the surfaces between plies.

10. An enclosing wall comprising two molded sections of multi-ply material permanently joined together edgewise with joints having surfaces that face toward the interior and the exterior of the circuit to form the complete enclosure.

11. An enclosing wall comprising two molded sections of multi-ply material joined together edgewise to form the complete enclosure, the plies being free from stresses applied by one ply to its neighboring plies.

12. A blank for a section of enclosing wall comprising a rigid multi-ply unit molded with tangential addenda at its edges, adapted to be worked away to form the joint to the next section, so as to leave the edges of the section free from internal stress.

13. A blank for a section of enclosing wall comprising a rigid multi-ply unit molded with plane portions at its edges, wherein each ply of the unit is in stress free relation to its adjoining plies.

14. A blank for a wall section of a water tight enclosure comprising a rigid multi-ply unit molded with its body portion curved up to the places of joints and with addenda at its edges, projecting beyond the predetermined plane of juncture and having stock adapted to be worked away in making the edge ready for joinder.

15. A blank for a wall section of enclosing wall a water tight enclosure comprising a rigid multi-ply unit molded with its body portion curved up to the places of joints and with addenda at its edges, projecting beyond the predetermined plane of juncture and having stock adapted to be worked into laps, each to coact with a corresponding lap of the adjoining section, for the securing of the units together.

16. A blank for a section of enclosing wall comprising a rigid multi-ply unit molded with addenda at its edges; said addenda being internally substantially free from stress and being adapted to be worked away to constitute joints between sections.

17. A circular multi-ply form comprising molded sections, each section being rigid and substantially free from internal stress and having edges parallel to the axis and adapted to fit corresponding edges of another section; and means for holding said sections together along the said edges to make a complete form.

18. A substantially circular enclosing wall consisting of two equal sections each extending half way around and fitted and joined to the other, each said section being composed of multi-ply material in which each ply is in only that state of internal strain which corresponds to the bending of it into semi-circular form and is substantially free from stresses imposed upon it by adjacent plies in the direction of the surface curvature.

Signed at Boston, Massachusetts, this first day of August, 1921.

HORACE W. HALL.